US006512603B2

(12) United States Patent  (10) Patent No.: US 6,512,603 B2
Saito  (45) Date of Patent: *Jan. 28, 2003

(54) IMAGE SENSOR

(75) Inventor: Oji Saito, Chigasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/177,487

(22) Filed: Oct. 23, 1998

(65) Prior Publication Data

US 2002/0135824 A1 Sep. 26, 2002

(30) Foreign Application Priority Data

Oct. 29, 1997 (JP) .............................................. 9-297160

(51) Int. Cl.$^7$ ................................................ H04N 1/46
(52) U.S. Cl. ..................... 358/509; 250/528.1; 250/358; 250/511
(58) Field of Search ................................. 358/509, 511, 358/475, 474, 500; 250/578.1, 234, 235, 578

(56) References Cited

U.S. PATENT DOCUMENTS

| | | | | |
|---|---|---|---|---|
| 4,783,700 A | * | 11/1988 | Nagane | 358/213.11 |
| 4,835,603 A | | 5/1989 | Kano et al. | 358/75 |
| 5,567,929 A | | 10/1996 | Ouimette | 250/214 |
| 5,751,444 A | * | 5/1998 | Ward | 358/471 |
| 5,781,651 A | | 7/1998 | Hsiao et al. | 382/127 |
| 6,055,072 A | * | 4/2000 | Tabata | 358/509 |

FOREIGN PATENT DOCUMENTS

| | | |
|---|---|---|
| JP | 1-293068 | 11/1989 |
| JP | 4-80174 | 7/1992 |
| JP | 5-48389 | 6/1993 |
| JP | 6-70090 | 3/1994 |
| JP | 7-221923 | 8/1995 |
| JP | 7-240816 | 9/1995 |

* cited by examiner

Primary Examiner—Jerome Grant, II
Assistant Examiner—Negussie Worku
(74) Attorney, Agent, or Firm—Fitzpatrick, Cella, Harper & Scinto

(57) ABSTRACT

Inputs and outputs to/from the outside can be performed together by a single connecting medium. The connecting medium includes connecting terminals for connecting to a plurality of input/output terminals of a second board and connecting terminals for connecting to a lead frame package as part of a light source.

9 Claims, 13 Drawing Sheets

IMAGE SENSOR

BACKGROUND OF THE INVENTION

1. Field of the Invention

The invention relates to an image sensor which can be used for a facsimile, a copying apparatus, a scanner, and the like and which reads reflection light from a read original surface by a sensor.

2. Related Background Art

Hitherto, as an original reading apparatus which is used for a facsimile, a copying apparatus, a scanner, or the like, there is a contact type image sensor for forming read images in a one-to-one corresponding manner by using a sensor array and reading the images at the same size as that of the read original.

In an example shown in FIG. 11, the contact type image sensor is constructed such that a sensor board 118 on which a plurality of sensor chips 112 on each of which a plurality of pixels for performing a photoelectric conversion are arranged and a protecting film 114 for protecting the plurality of sensor chips 112 are mounted, a light source 117 for irradiating light onto an original to be read, a rod lens array 102 serving as a lens for forming an image of the read original to the pixels of the sensor chips 112, and a cover glass 101 serving as an original reading surface are attached to a frame 109 serving as supporting means.

In the contact type image sensor, input/output terminals 124 of the sensor board 118 on which the plurality of sensor chips 112 are mounted and electric circuit wirings to drive the sensor chips are arranged and driving terminals of the light source for irradiating the original are formed by different constructions at remote positions. According to the sensor board 118, a wiring pattern is formed by a conductor such as Ag-Pd or the like onto a ceramics board and the surface on the wiring pattern is protected by an insulating coating material. The input/output terminals 124 of the circuit wirings are conductive terminals which are arranged at an equal pitch on the side of the sensor chip installing surface and have an area which enables the electrical connection to the outside, connecting parts, or the like.

The light source 117 uses an LED array in which a plurality of LED devices or the like are arranged in order to irradiate the light to a region of a length corresponding to the original reading size. Lead wires 123 or the like are used as driving terminals of the LED array. FIG. 12 is a detailed diagram of this portion. According to those two terminal portions, first, a flexible printed circuit board 116 (hereinafter, abbreviated as an FPC) is connected to the terminal portion 124 of the sensor board 118, the FPC 116 connected to the sensor array 119 and the lead wires 123 of the LED array are soldered to a printed circuit board 126 (glass epoxy or the like) on which sensor chip driving parts, connectors, and the like are mounted, inputs and outputs to/from the outside are enabled to be performed in a lump by one connector 115 or the like, and after that, the printed circuit board 126 is fixed to the frame 109, thereby constructing a contact type image sensor as shown in FIG. 13.

In the example shown in FIG. 14, a sensor board 218 is a printed circuit board (refer to FIGS. 15 and 16) made of a glass epoxy resin or the like in which wirings are formed on both surfaces. Not only circuit wirings for driving the sensor chips but also terminals 225 for connecting a light source are formed in edge portions of the back surface of the board 218. Wirings from the terminals 225 are also conductor terminals in which concentrated inputting/outputting terminals 224 are arranged at an equal pitch on the back surface on the side opposite to the sensor chip installing surface and each of which has an area that enables an electrical connection to the outside or connecting parts or the like. As a light source 217, a structure in which an LED package comprising one or more LED devices or the like is arranged at the edge surface on a light guiding plate 205 for guiding the light in the main scanning direction and converging it to an original reading portion is used. Driving terminals of the light source serve as a lead frame 204. In this case, as shown in FIG. 16, as for each terminal, terminals 223 of the lead frame 204 of the light source are soldered to the light source connecting terminals 225 provided in the edge portion of the back surface of the sensor board 218 and a connecting part such as a connector 215 or the like which can perform inputs and outputs to/from the outside in a lump by one part is attached to the terminals 224 for inputting and outputting, thereby constructing a contact type image sensor as shown in FIG. 17.

In the foregoing contact type image sensor, however, in order to construct in a manner such that the input/output terminals 124 of the sensor board 118 and the driving terminals of the light source 117 which are formed by the different constructions at the remote positions are concentrated to the connecting medium such as a connector 115 or the like and the inputs and outputs can be executed in a lump, relay connecting media such as FPC 116, individual printed circuit board 126, and the like are needed. Consequently, since the component parts are complicated and enlarged in size, assembling performance deteriorates. The costs rise due to an increase in the number of parts or the like.

SUMMARY OF THE INVENTION

It is an object of the invention to provide a small image sensor which can be easily assembled.

To accomplish the above object, according to a preferred embodiment of the invention, there is provided an image sensor comprising: a light source for irradiating an original; a sensor board on which a plurality of sensor chips are mounted; and a single connecting medium which is directly connected to lead terminals of the light source and input/output terminals of the sensor board and is used to perform inputs and outputs to/from an outside in a lump.

With this construction, a small image sensor which can be easily assembled can be provided.

The above and other objects and features of the present invention will become apparent from the following detailed description and the appended claims with reference to the accompanying drawings.

DETAILED DESCRIPTION OF THE PREFERRED EMBODIMENTS

The invention will now be described in detail hereinbelow with respect to an embodiment of a contact type image sensor and a flat bed type image sensor. The invention is not limited to this embodiment but can be embodied by a form of an information processing apparatus having those sensors.

Figure 1:
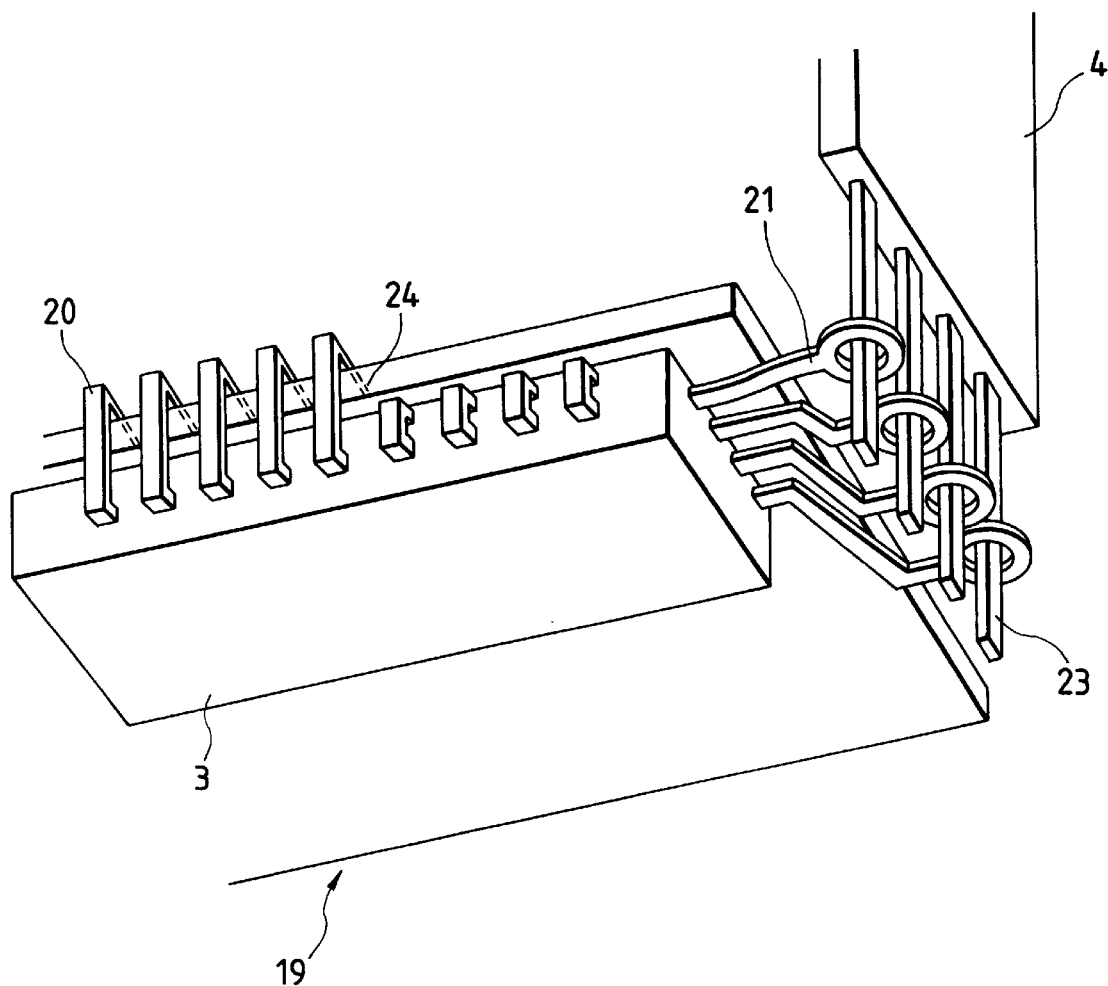
FIG. 1 is a diagram showing a construction of a main section of an embodiment 1.

FIG. 1 is a diagram showing a construction of a main section of a contact type image sensor according to a first embodiment.

Figure 2:
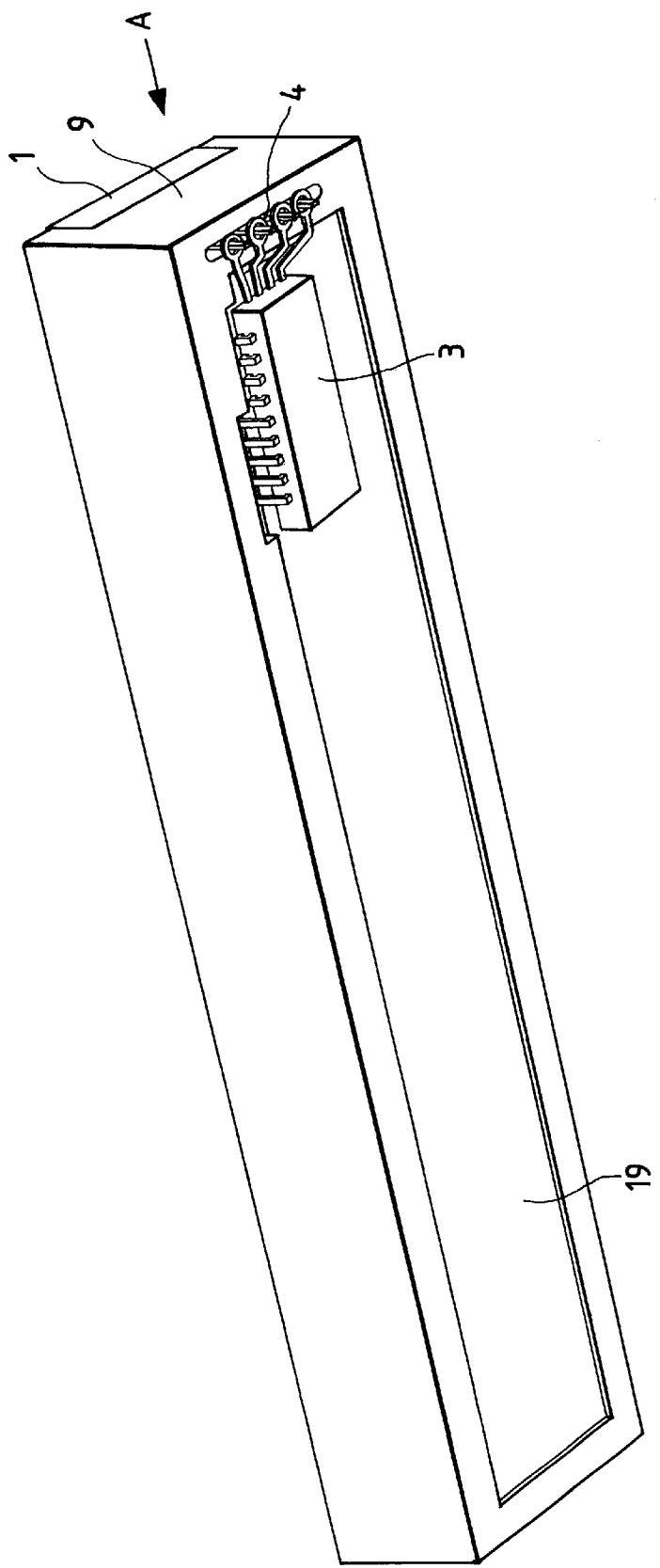
FIG. 2 is an external perspective view of the embodiment 1.
Figure 3:
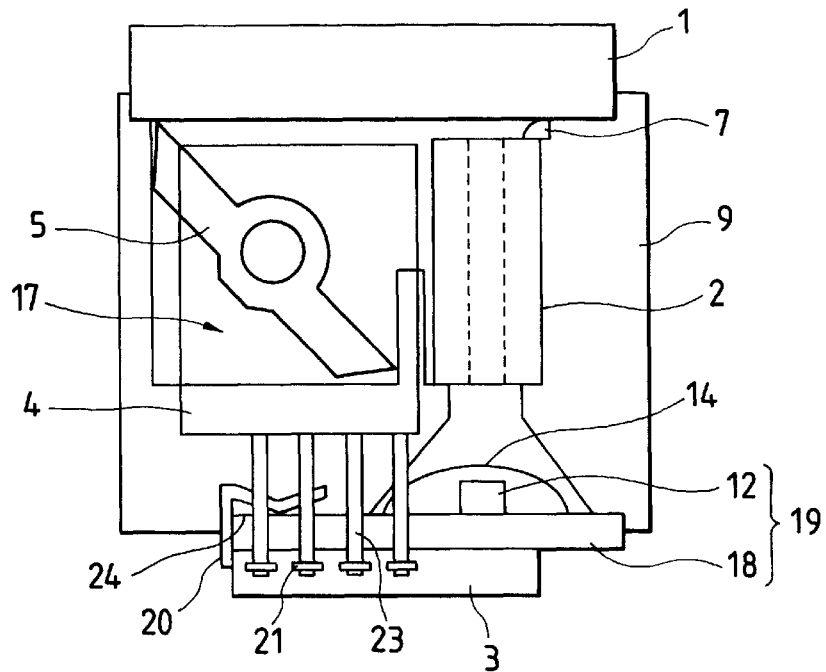
FIG. 3 is a perspective cross sectional view which is seen from an arrow A in FIG. 2.
Figure 4:
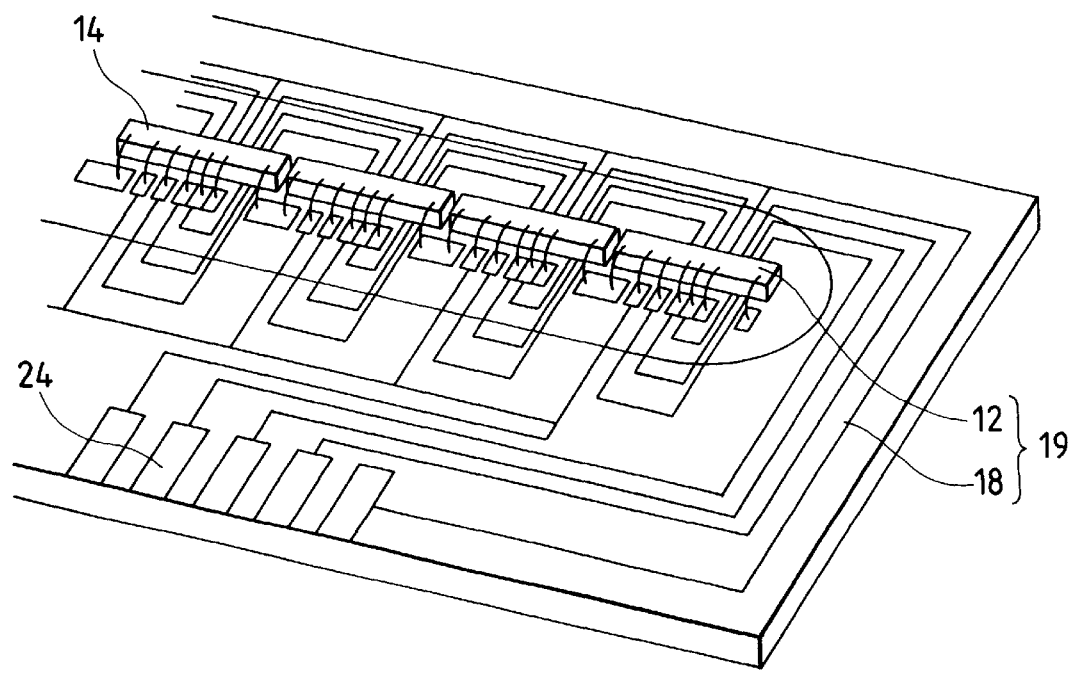
FIG. 4 is an external view of a sensor array.

FIG. 2 is an external perspective view of the contact type image sensor of the embodiment. FIG. 3 is a perspective cross sectional view when it is seen from the direction of an arrow A. FIG. 4 is an external view of a sensor array 19.

Figure 5:
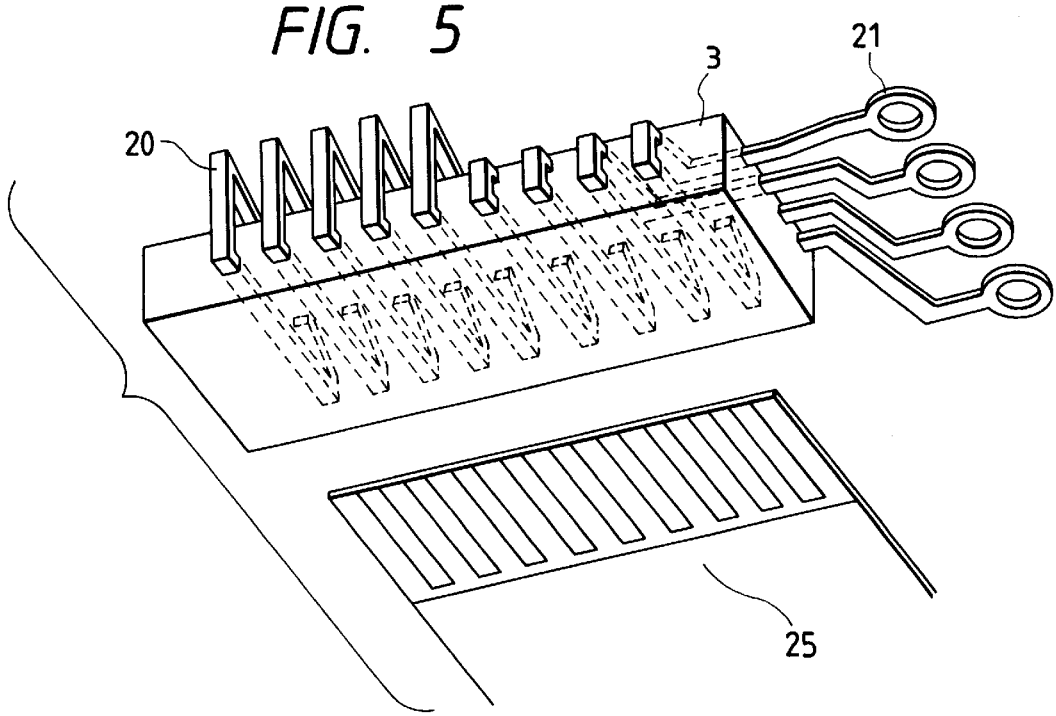
FIG. 5 is an external perspective view of a connecting medium.

As shown in FIG. 4, a plurality of sensor chips 12 to perform a photoelectric conversion are installed in a line on a sensor board 18. Wiring processes such that a plurality of terminals for performing inputs and outputs (I/O) to/from the outside are provided or the like are performed on one surface of the sensor board 18. The sensor array 19 is formed by the sensor board 18 and the sensor chips 12 which are installed thereon and function as photoelectric converting devices. As shown in FIG. 3, the contact type image sensor of the embodiment is constructed by: a rod lens array 2 for forming an image of the light from the original; a light source 17 (comprising a lead frame package 4 having a plurality of terminals on which LED devices serving as light emitting sources are installed and a light guiding member 5 for guiding the light in the main scanning direction) to irradiate the original; a cover glass 1 with which the original which is conveyed is come into contact; the sensor array 19 comprising the sensor board 18 and sensor chips 12; and a frame 9 for supporting those component elements. This contact type image sensor has a single connecting medium 3 for directly connecting a plurality of external input/output terminals 24 of the sensor board 18 to a plurality of lead terminals 23 of the lead frame package 4 of the light source. As shown in FIG. 5, the single connecting medium 3 comprises: an ordinary FFC (flexible flat cable) or FPC (flexible printed circuit board) connecting portion 25 which is connected from the outside; terminals 20 which can be connected to a plurality of external input/output terminals 24 of the sensor board 18; and terminals 21 to which the plurality of lead terminals 23 of the lead frame package 4 can be connected by directly soldering or by coming into pressure contact. The sensor board 18 and the terminals of the lead frame package 4 of the light source are concentrated, thereby enabling them to be connected to the outside in a lump. In FIG. 5, although the single connecting medium 3 is constructed for the FFC 25 or FPC, a pin header type of the pressure bonding type or the pressure contact type can be also constructed.

Figure 6:
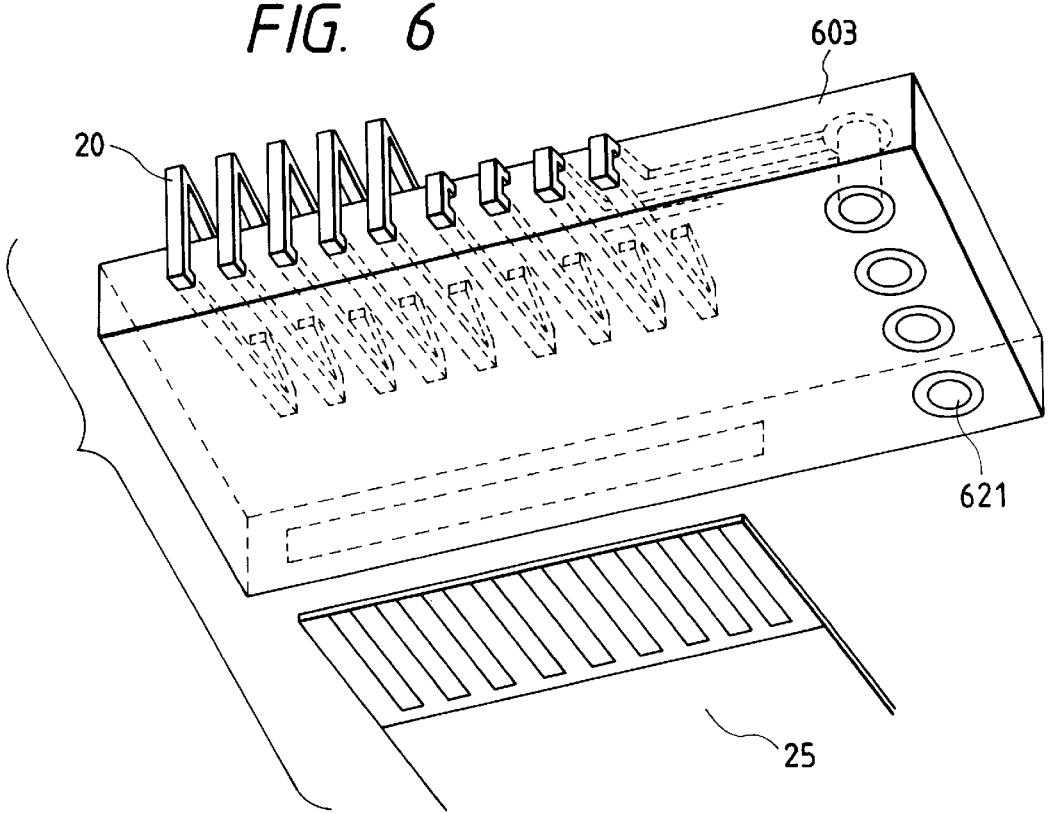
FIG. 6 is an external perspective view of a modification of a connecting medium.

FIG. 6 is a modification of the connecting medium of FIG. 5 and shows a type in which lead portions 621 for connecting to the terminals of the lead frame package of the light source are integratedly molded in a mold of a connecting medium 603.

According to the embodiment as described above, in order to enable the inputs and outputs to be performed in a lump for a plurality of input/output terminals of the circuit board on which the sensor chips are installed and a plurality of lead terminals of the lead frame package of the light source, they are concentrated to the single connecting medium which can be directly connected. Consequently, the following advantages are obtained.

(1) The sensor board which can assure a high installing precision of the sensor chips and whose working performance is severe can be used at a low cost by a simple wiring.

(2) The number of parts is reduced and the cost down can be realized.

(3) The light weight and small size can be performed and the miniaturization of the apparatus can be also realized.

(4) Since the direct connection is performed, working time can be reduced.

Figure 7:
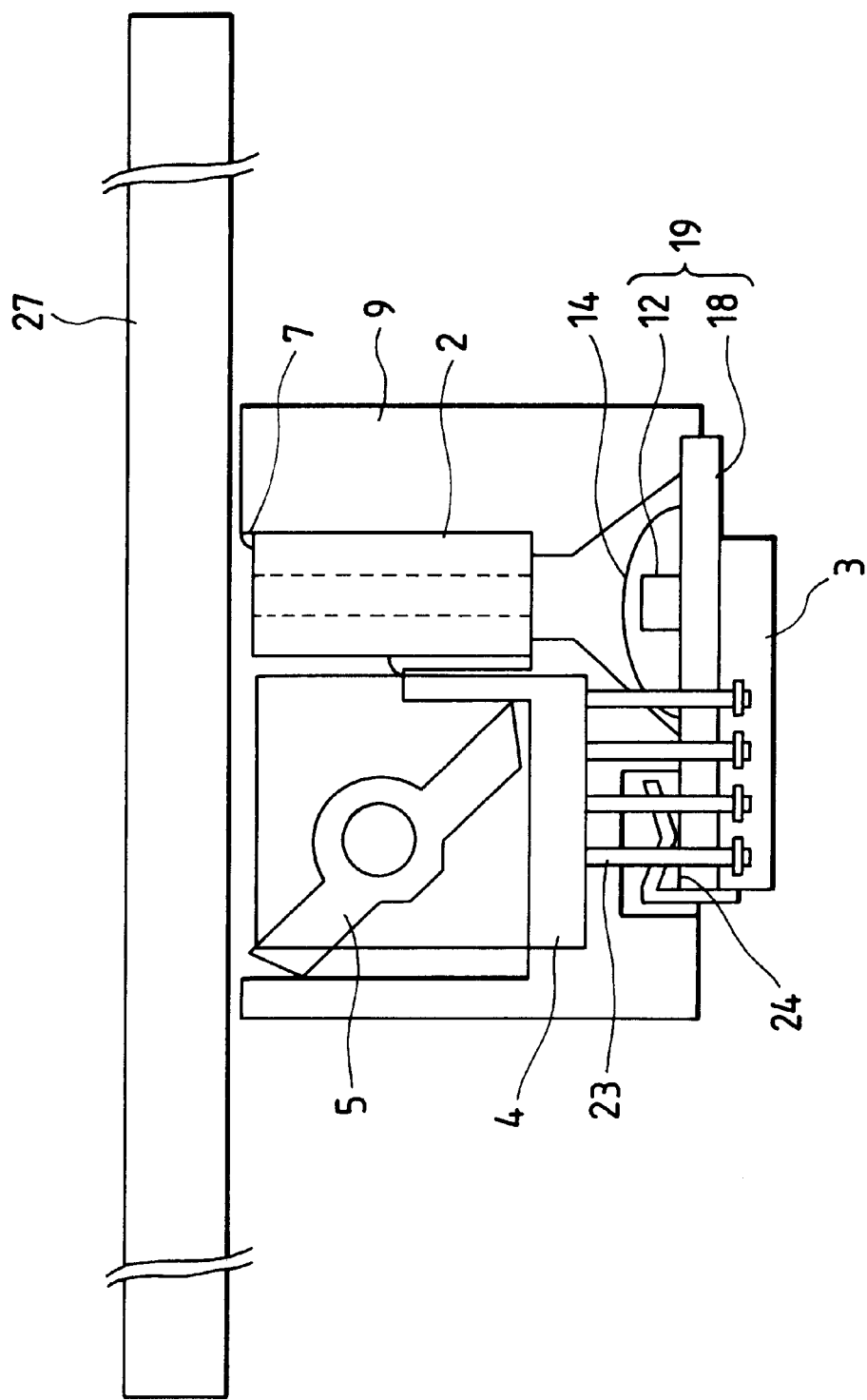
FIG. 7 is a perspective cross sectional view of an embodiment 2.

FIG. 7 is a cross sectional view of a reading portion of a "flat bed type image sensor" according to a second embodiment. Even in such a type of image sensor, the connection to the outside can be performed in a lump by using the single connecting medium 3 which enables the direct connection of a plurality of external input/output terminals 24 of the sensor board 18 and a plurality of lead terminals 23 of the lead frame package 4 of the light source.

As described above, even in the embodiment, effects similar to those in the first embodiment can be obtained.

Figure 8:
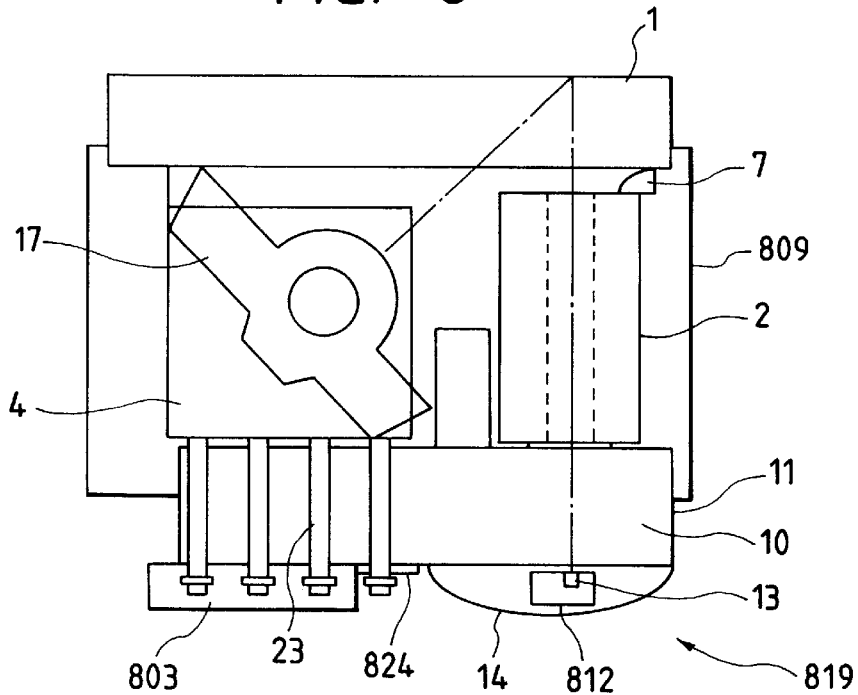
FIG. 8 is a perspective cross sectional view of an embodiment 3.
Figure 9:
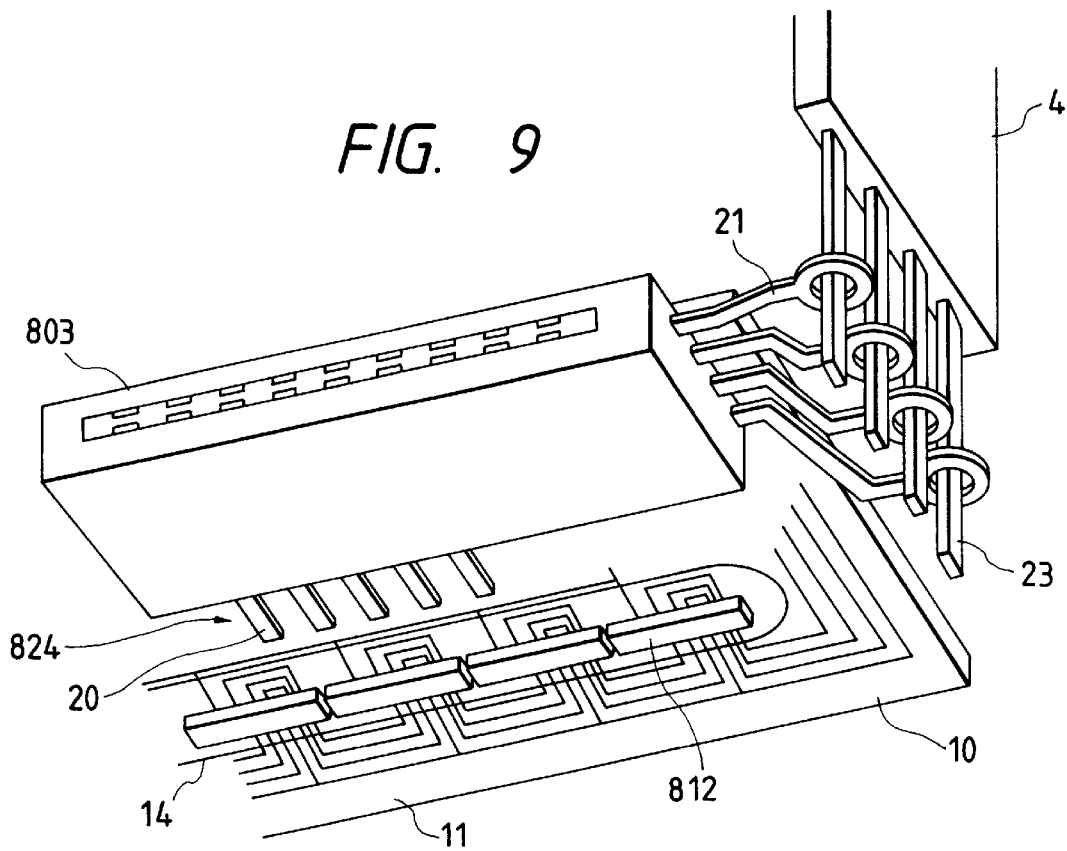
FIG. 9 is a diagram showing a construction of a main section of the embodiment 3.

FIG. 8 is a cross sectional view of a "contact type image sensor" according to a third embodiment. FIG. 9 is a diagram enlargedly showing a characteristic portion of the embodiment. As shown in FIG. 8, the contact type image sensor comprises: a sensor array 819 constructed in a manner such that a plurality of sensor chips 812 for performing the photoelectric conversion are installed in a line in a face-down state onto a light translucent board 10 made of, for example, glass or the like; the rod lens array 2 for forming an image of the light from the original; the light source 17 for irradiating the original; the cover glass 1 for supporting the original which is conveyed; and a frame 809 for supporting them. On the light translucent board 10, a plurality of terminals 824 for performing inputs and outputs (I/O) to/from the outside are provided on the installing surface side of the sensor chips 812. Even in the case of such a type, like a connector for surface installation for a board-to-wiring structure, the single connecting medium 803 has: the terminals 20 which can be connected to a plurality of external input/output terminals 824 of the light translucent board 10; and the terminals 21 which can be directly connected to a plurality of lead terminals 23 of the lead frame package 4 of the light source, thereby enabling the batch connection to the outside.

As described above, even in the embodiment, effects similar to those of the first embodiment can be obtained.

Figure 10:
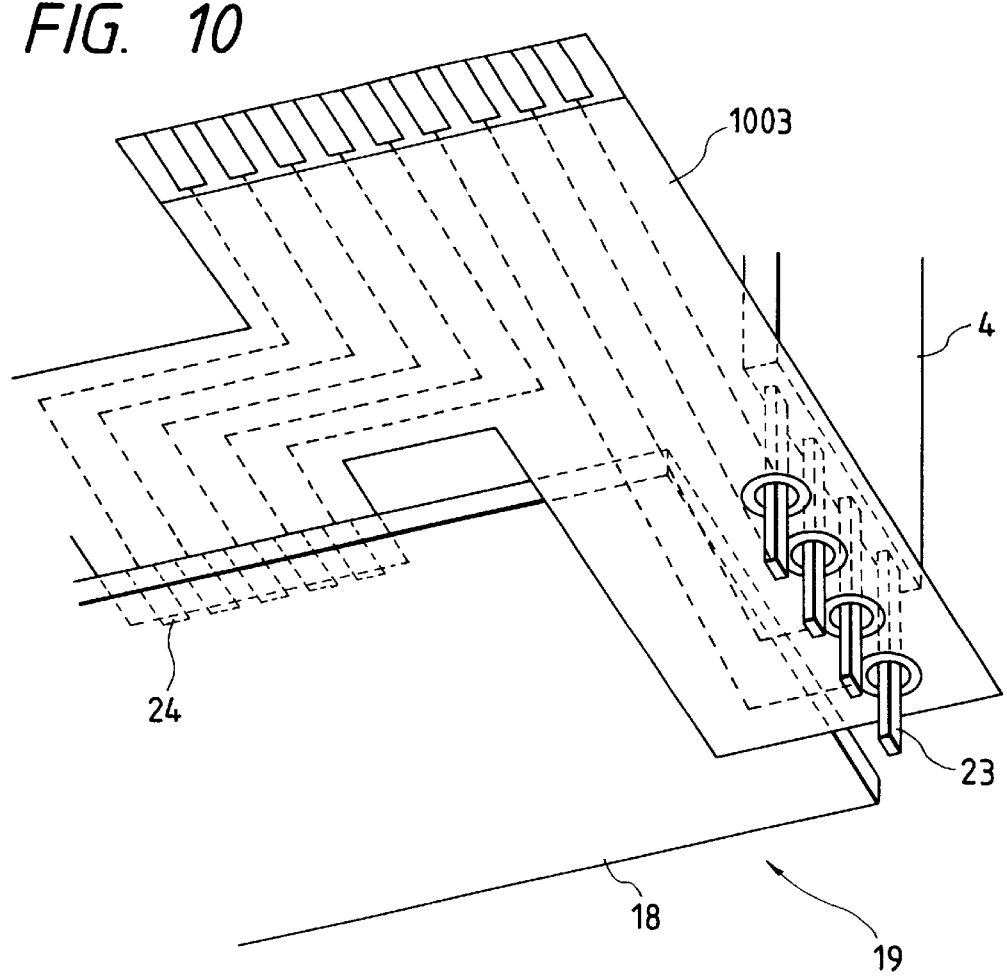
FIG. 10 is a diagram showing a construction of a main section of an embodiment 4.
Figure 11:
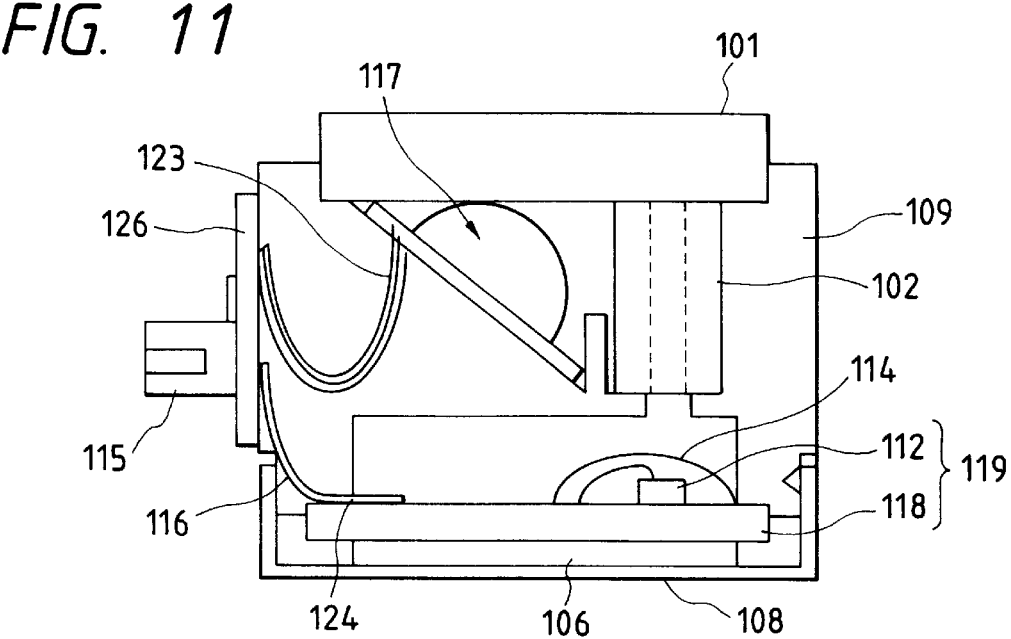
FIG. 11 is a perspective cross sectional view of prior art device.
Figure 12:
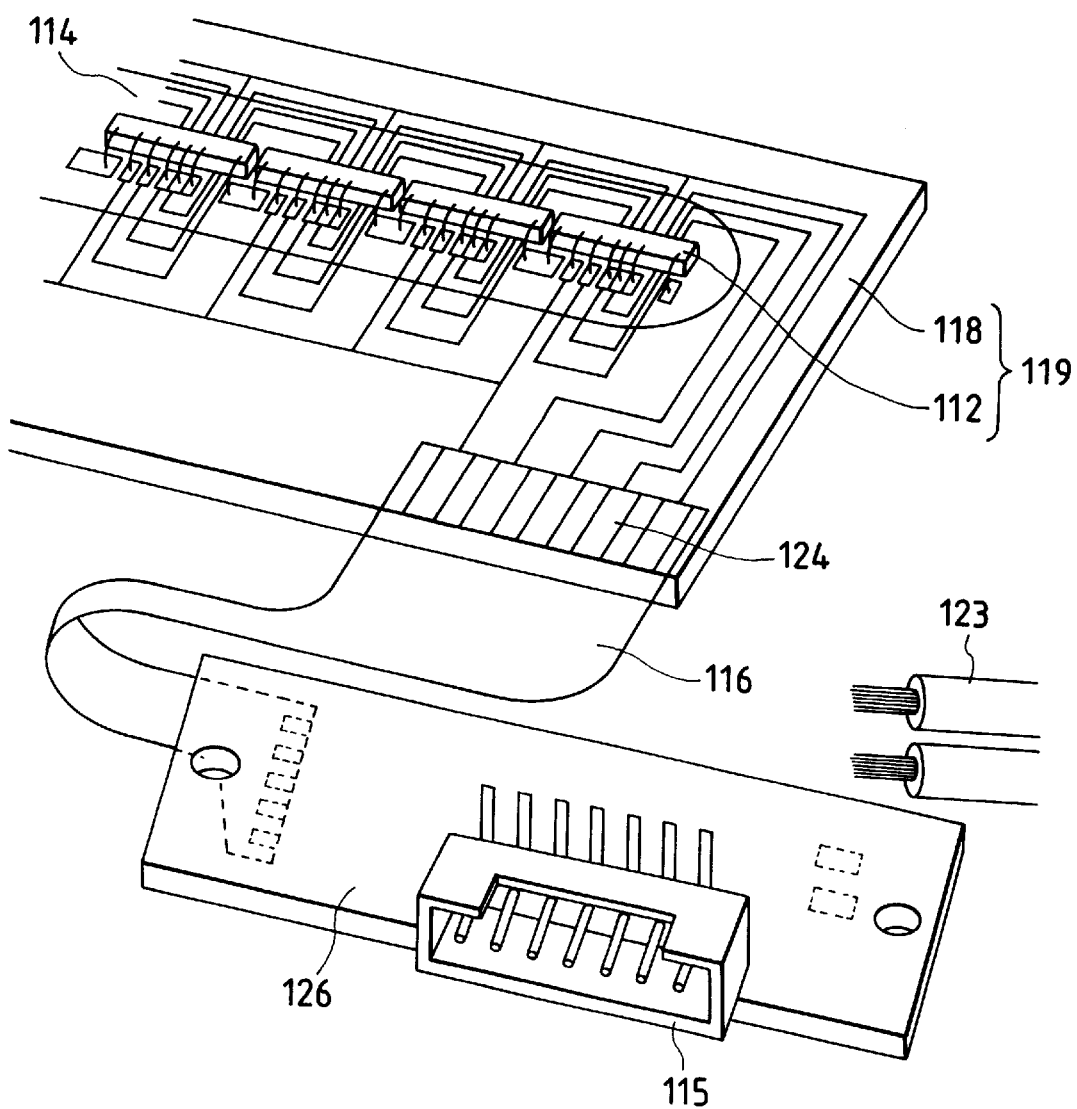
FIG. 12 is a diagram showing a construction of a main section of the prior art device.
Figure 13:
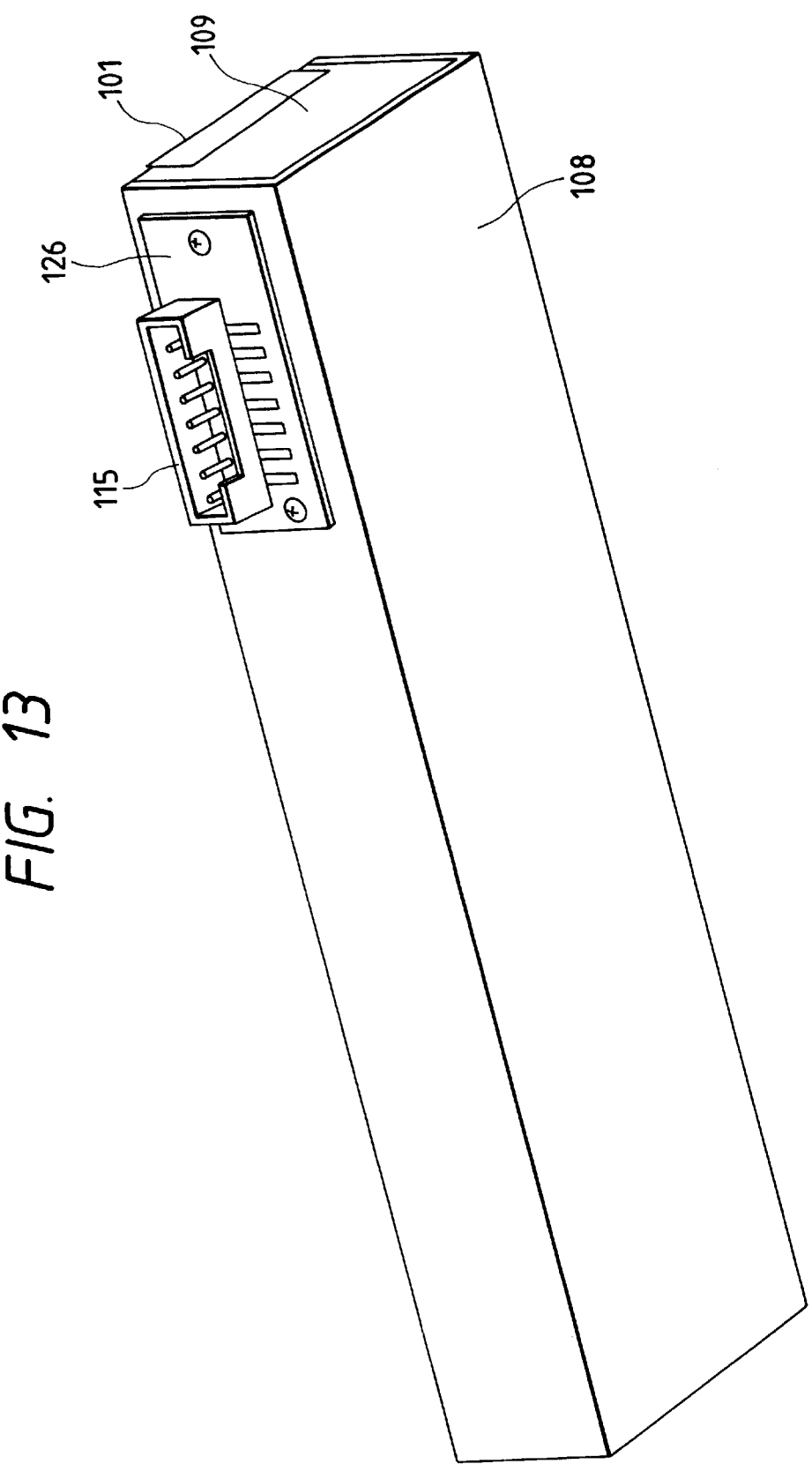
FIG. 13 is an external perspective view of the prior art device.
Figure 14:
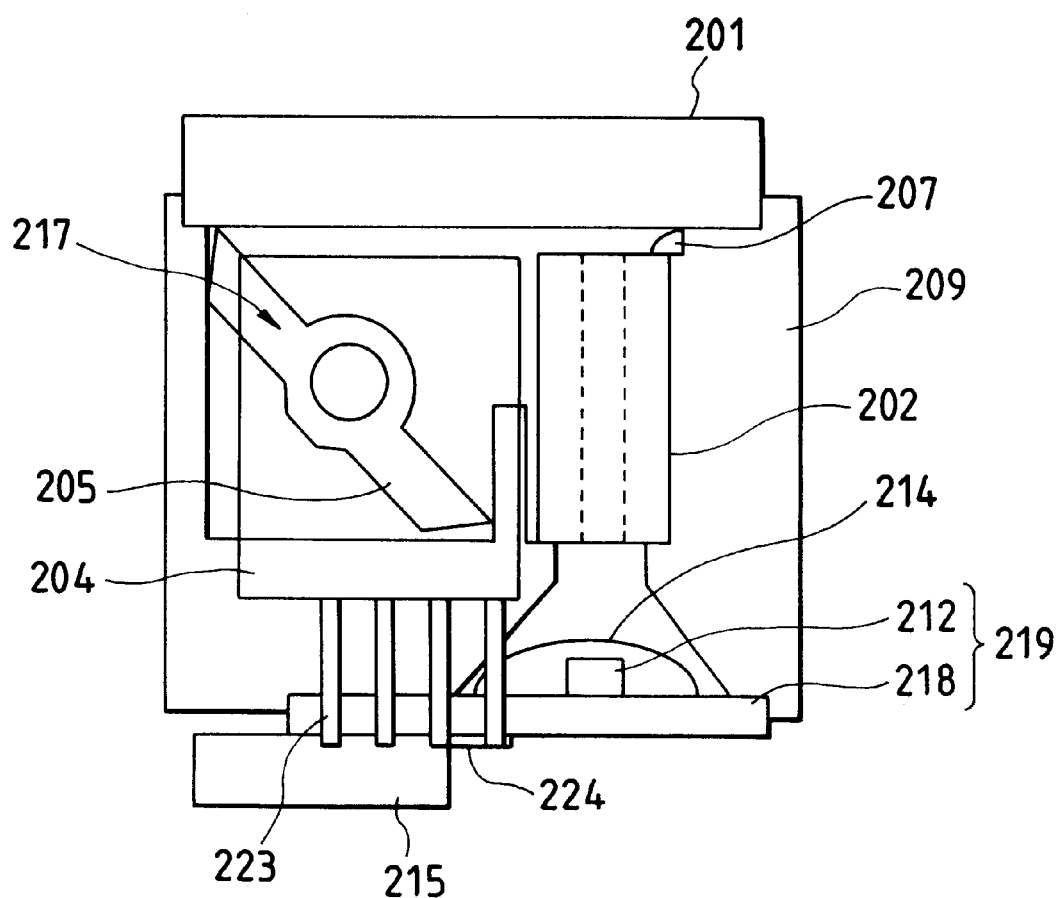
FIG. 14 is a perspective cross sectional view of a second prior art device.
Figure 15:
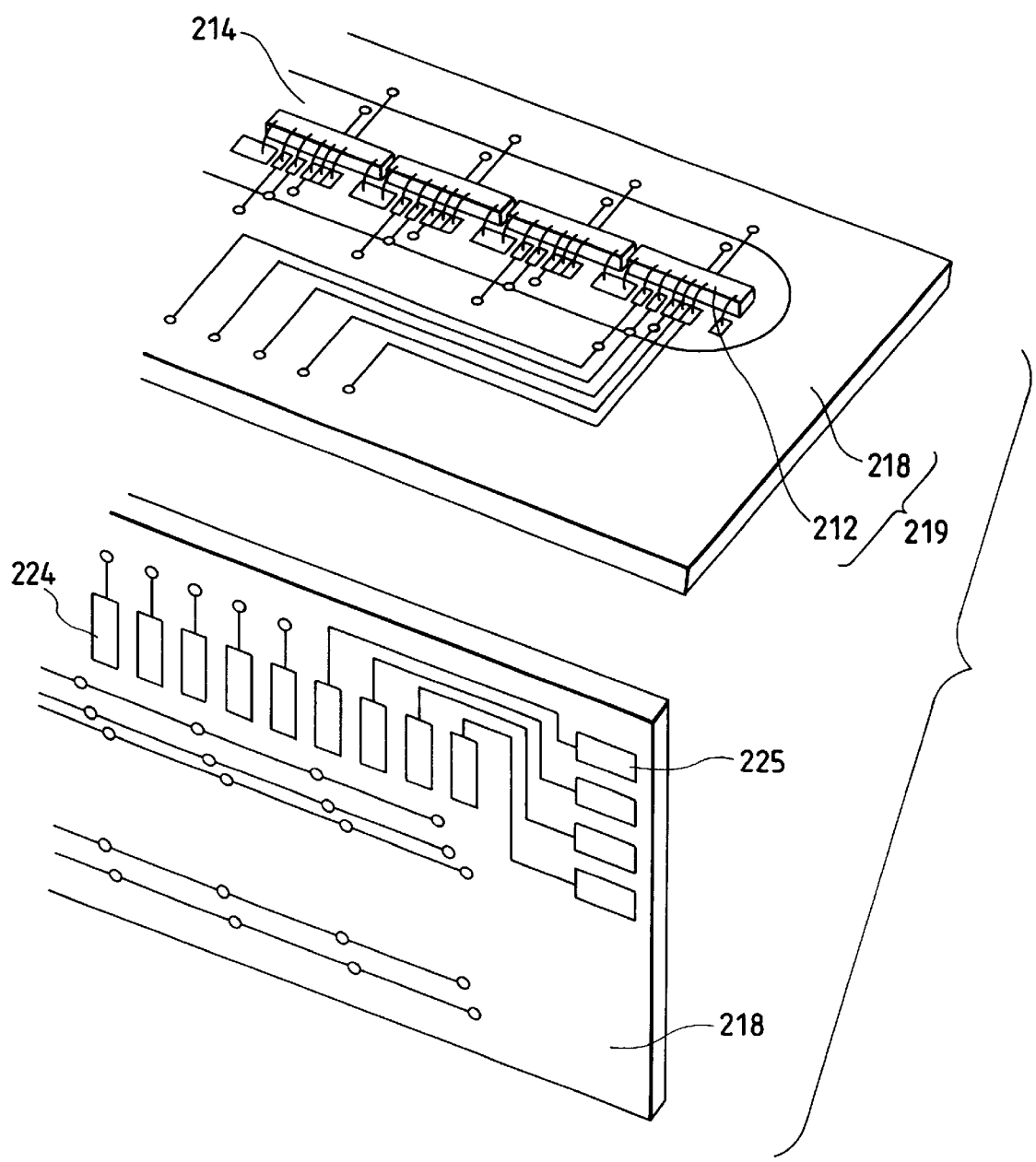
FIG. 15 is a diagram showing a top view and a bottom view of a sensor board of the second prior art device.
Figure 16:
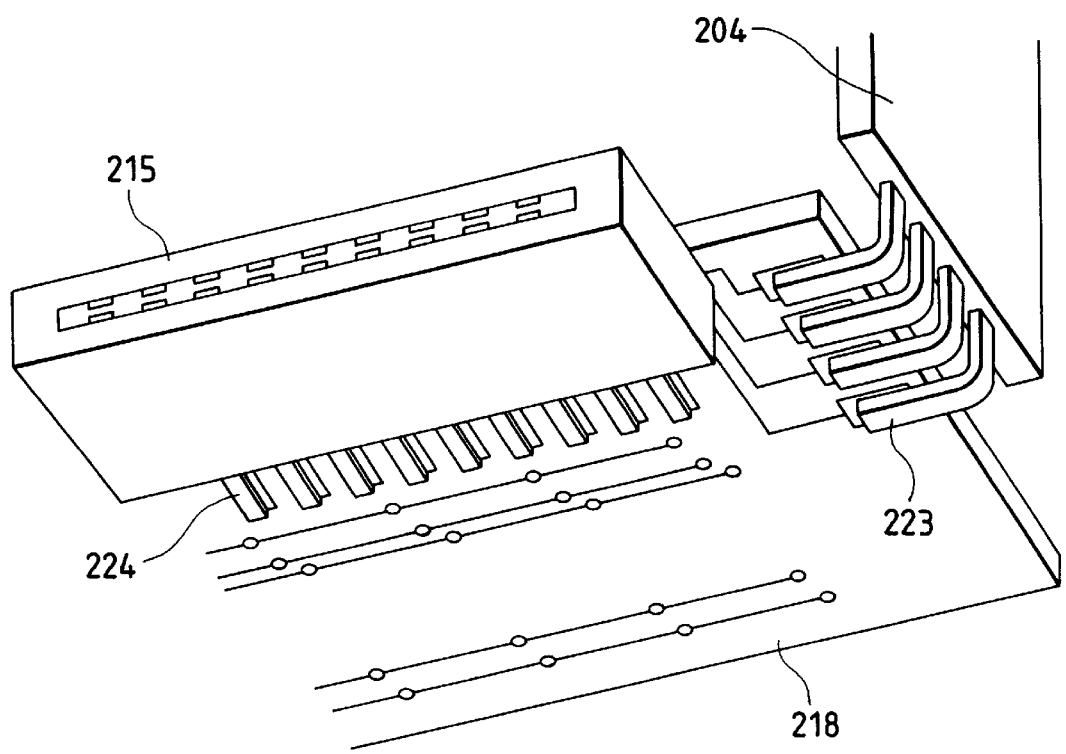
FIG. 16 is a diagram showing portions around a connector of the second prior art device.
Figure 17:
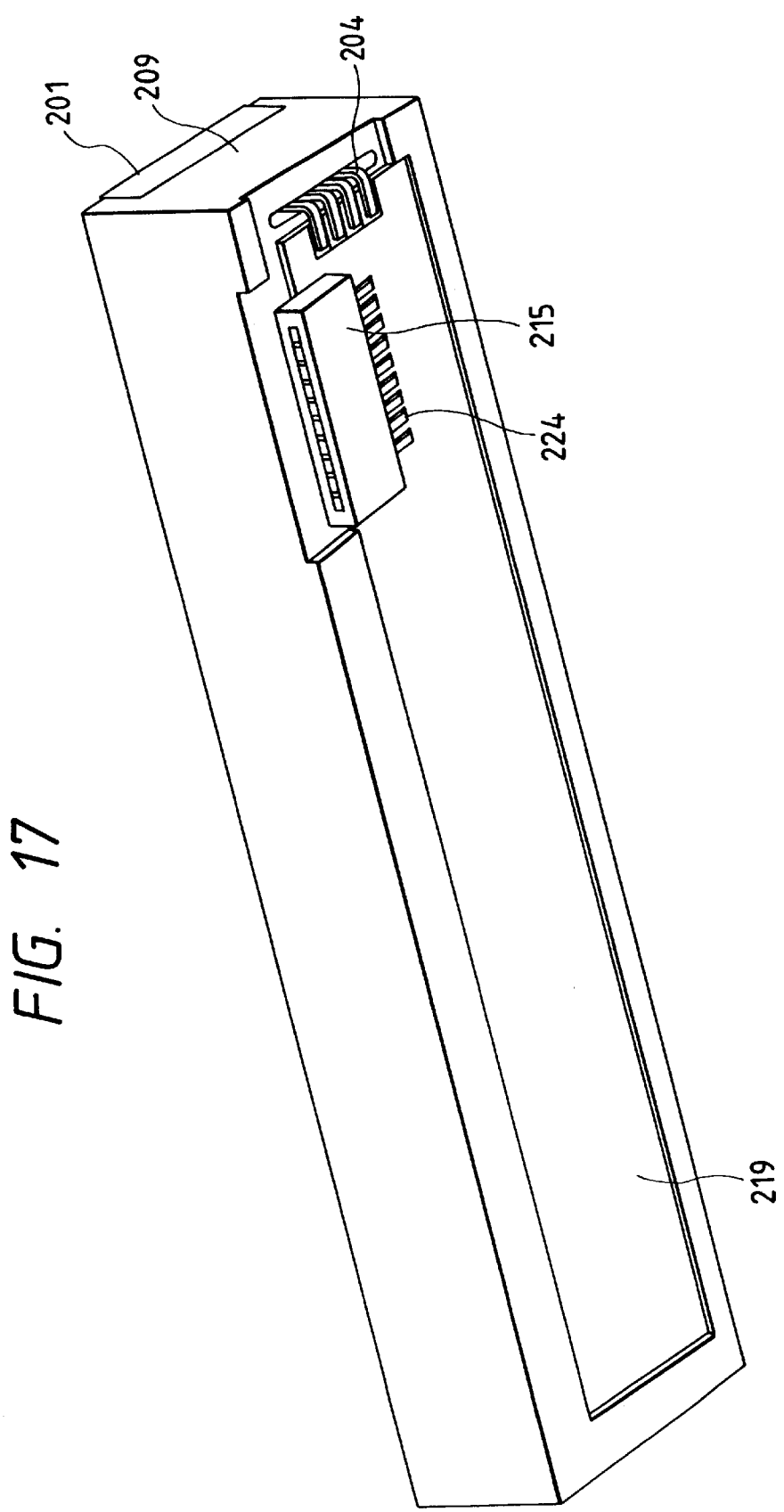
FIG. 17 is an external perspective view of the second prior art device.

FIG. 10 is a diagram enlargedly showing a characteristic portion of a "contact type image sensor" according to a fourth embodiment.

According to the embodiment, as shown in FIG. 10, an FPC (flexible printed circuit board) is used as a single connecting medium 1003 for enabling a direct connection between the plurality of external input/output terminals 24 of the sensor board 18 of the sensor array 19 and the plurality of lead terminals 23 of the lead frame package 4 of the light source. Wirings of the sensor board 18 and the terminals of the lead frame package 4 are concentrated to one location at an equal pitch and are led out to the outside, thereby making it possible to connect to a general connector or the like. A whole construction of the embodiment is similar to that of the first embodiment except for a connection medium portion.

According to the embodiments as described above, by using the printed circuit board as a single connecting board, effects similar to those in the first embodiment can be obtained.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image sensor comprising:

a light source for irradiating an original;

a sensor board on which a sensor chip including a plurality of photoelectric conversion elements and an input/output terminal for driving said sensor chip are installed; and a connector for external connection, said connector including a first connection terminal for electrically connecting said input/output terminal and an external terminal, a second connection terminal for electrically connecting a lead terminal of said light source and the external terminal, and a connector body on which said first connection terminal and said second connection terminal are installed, wherein said sensor board is sandwiched between said first connection terminal and said connector body so that said first connection terminal is electrically connected to said input/output terminal.

2. A sensor according to claim 1, wherein said lead terminals of said light source and said second connection terminal are connected by soldering.

3. A sensor according to claim 1, wherein said lead terminals of said light source and said second connection terminal are connected by a pressure contact.

4. A sensor according to claim 1, further comprising a rod lens array for forming an image of light from the original onto said photoelectric conversion pixels.

5. A sensor according to claim 4, further comprising an original supporting member which supports the original.

6. A sensor according to claim 5, further comprising a frame for supporting said light source, said sensor board, said rod lens array, and said original supporting member.

7. A sensor according to claim 1, further comprising an original supporting member which supports the original.

8. A sensor according to claim 1, wherein said connector includes an engaging portion for engaging a flexible flat cable or a flexible printed circuit board.

9. A sensor according to claim 1, wherein said connector includes an engaging portion of a pin header type of a pressure bonding type or a pressure contact type.

* * * * *

UNITED STATES PATENT AND TRADEMARK OFFICE
CERTIFICATE OF CORRECTION

PATENT NO.    : 6,512,603 B2
DATED         : January 28, 2003
INVENTOR(S)   : Oji Saito It is certified that error appears in the above-identified patent and that said Letters Patent is hereby corrected as shown below:

<u>Title page,</u>
Item [57], ABSTRACT,
Line 4, "second board" should read -- sensor-board --.

Signed and Sealed this

Twenty-seventh Day of January, 2004

JON W. DUDAS
*Acting Director of the United States Patent and Trademark Office*